(12) United States Patent
Asayama (10) Patent No.: US 6,900,994 B2
(45) Date of Patent: May 31, 2005

(54) POWER SUPPLY APPARATUS, SWITCHING POWER SUPPLY APPARATUS, AND IMAGE FORMING APPARATUS

(75) Inventor: Atsushi Asayama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/603,605

(22) Filed: Jun. 26, 2003

(65) Prior Publication Data

US 2004/0000897 A1 Jan. 1, 2004

(30) Foreign Application Priority Data

Jul. 1, 2002 (JP) .................................... 2002-192173

(51) Int. Cl.[7] .................. H02M 3/335; B41L 39/00
(52) U.S. Cl. .................. 363/21.01; 399/37; 399/88
(58) Field of Search .................. 363/16, 20, 21.01, 363/40, 41, 95, 97, 131; 399/37, 76, 88, 90

(56) References Cited

U.S. PATENT DOCUMENTS

| | | | |
|---|---|---|---|
| 5,612,857 A | * 3/1997 | Ishikawa | 363/21.02 |
| 5,619,403 A | 4/1997 | Ishikawa et al. | 363/21 |
| 6,040,662 A | 3/2000 | Asayama | 315/291 |
| 6,408,148 B1 | * 6/2002 | Yamamoto | 399/88 |
| 6,806,445 B2 | * 10/2004 | Satoh | 219/482 |

\* cited by examiner

*Primary Examiner*—Matthew V. Nguyen
(74) *Attorney, Agent, or Firm*—Fitzpatrick, Cella, Harper & Scinto (57) ABSTRACT

A power source control chip which is a high voltage controlling portion is added to an ASIC for sequence control constituting a sequence control unit. A PWM signal is sent from the high voltage controlling portion to a high voltage producing portion constituting a high voltage unit, and an output detection signal is sent from the high voltage producing portion to the high voltage controlling portion, thereby effecting feedback control. At that time, a modulated wave PWM/detection signal amplitude-modulated with the PWM signal as a carrier wave and with the output detection signal as a modulating wave is produced and is transmitted onto a signal line, whereby the number of signal lines can be decreased.

14 Claims, 11 Drawing Sheets

POWER SUPPLY APPARATUS, SWITCHING POWER SUPPLY APPARATUS, AND IMAGE FORMING APPARATUS

BACKGROUND OF THE INVENTION

1. Field of the Invention

The invention relates to a power supply apparatus and an image forming apparatus, and particularly to a power supply apparatus suitable as the power source of an image forming apparatus such as a copying machine or a printer using an electrophotographic process, and an image forming apparatus using the power supply apparatus.

2. Description of Related Art

Due to the rapid advance of digital technology and semiconductor integrated circuit technology in recent years, it has been practiced to digitize the control of the switching power supply of a copying machine and printer and a high voltage source, make a chip for control and mount it in a power supply apparatus.

Figure 1:
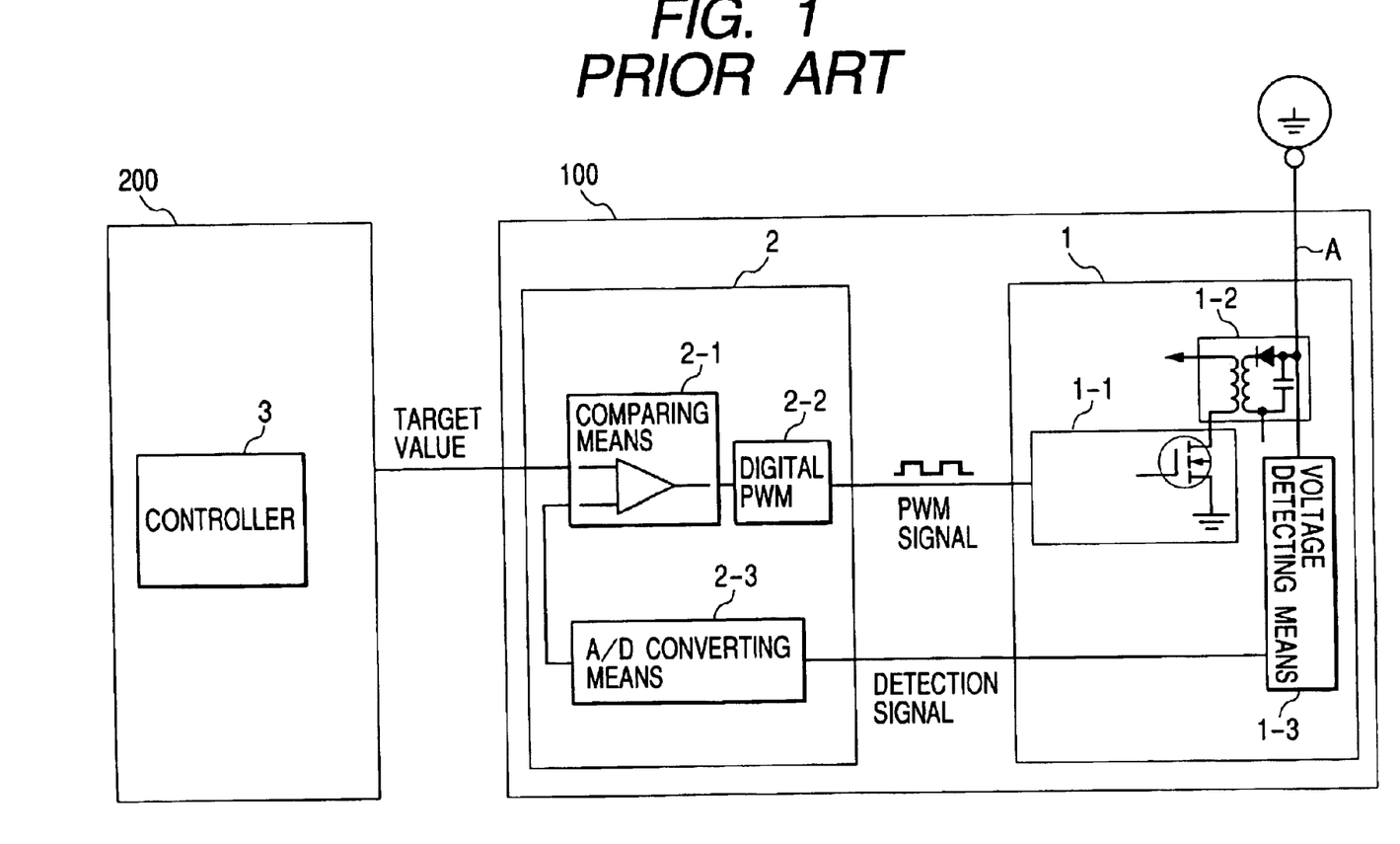
FIG. 1 is a block diagram schematically showing the construction of an example of the conventional art.
Figure 2:
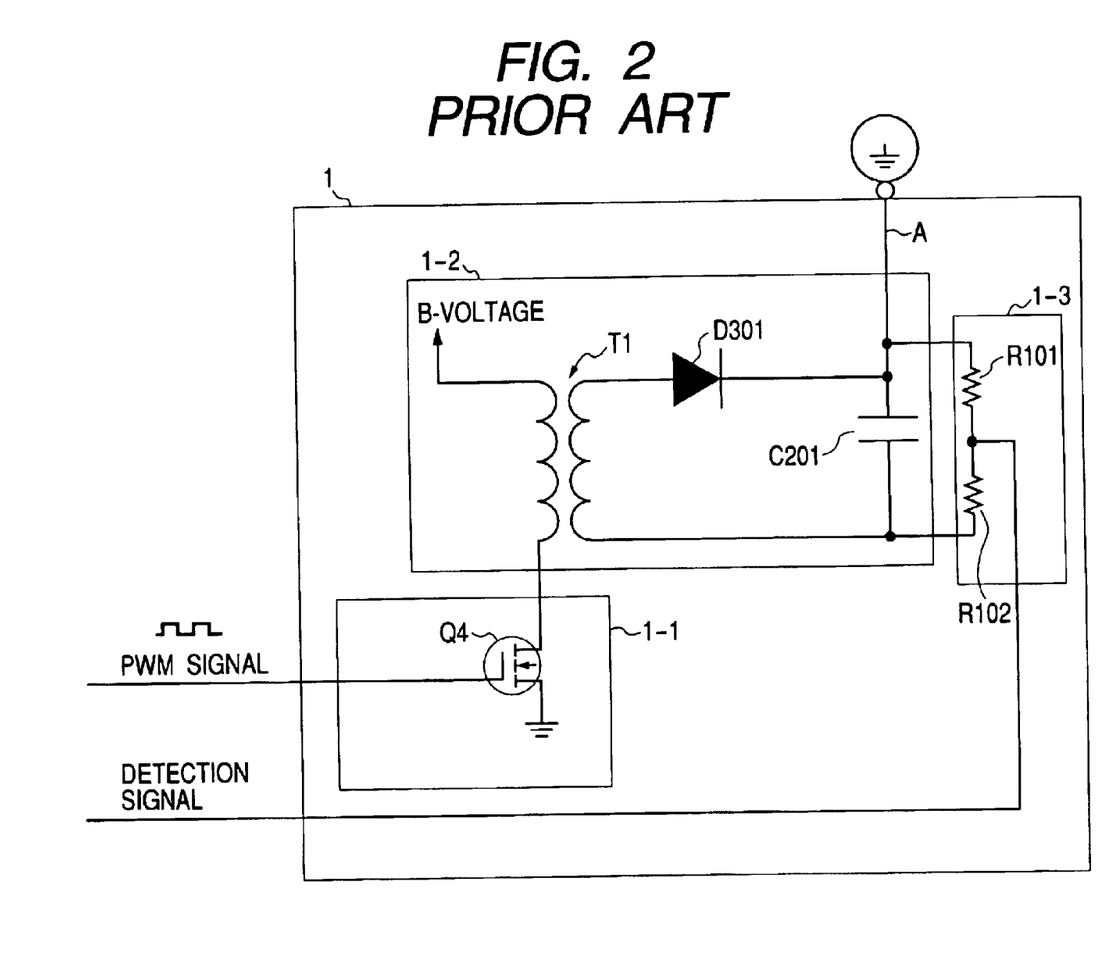
FIG. 2 is a circuit diagram showing the details of high voltage producing means is FIG. 1.
Figure 3:
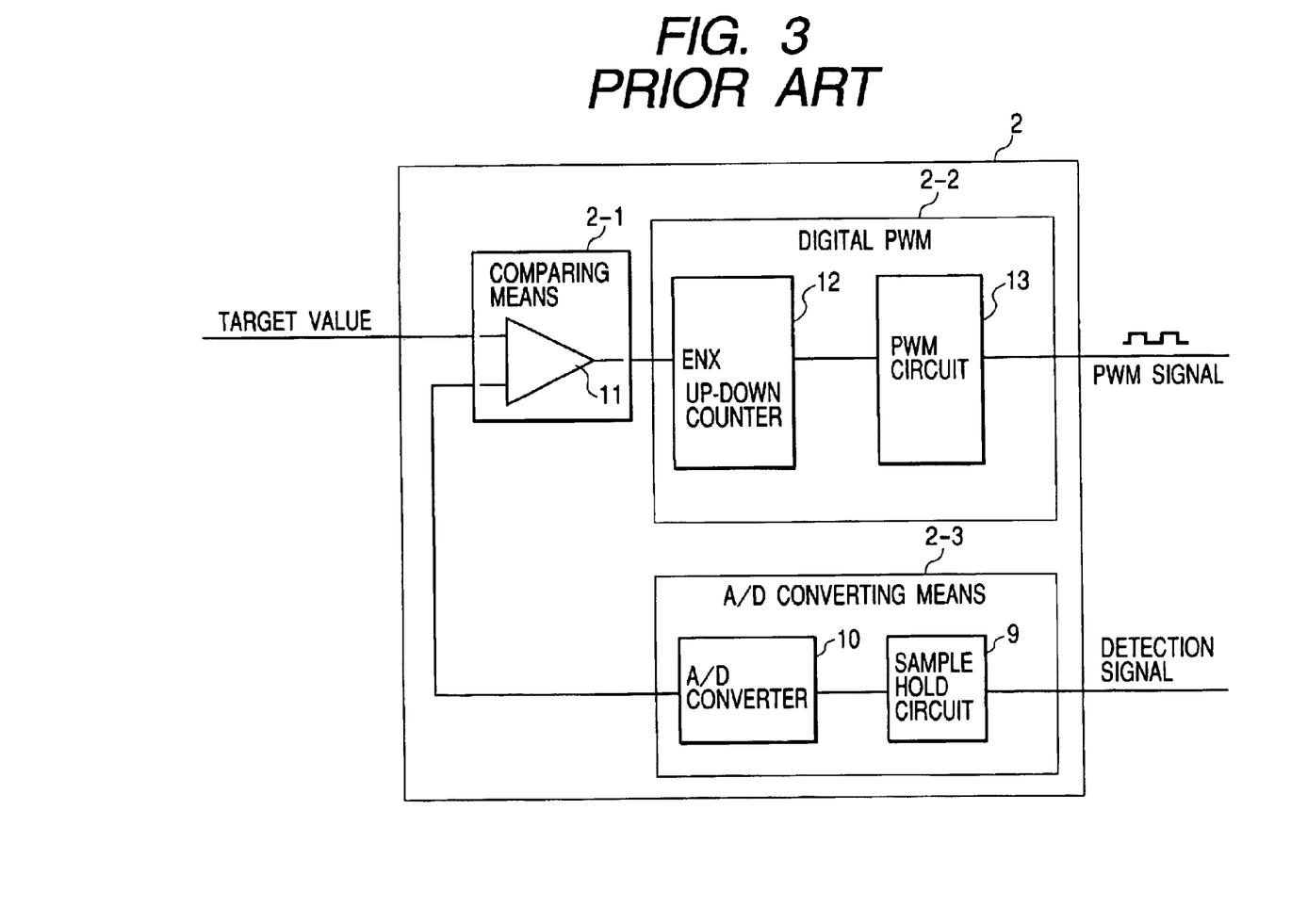
FIG. 3 is a block diagram showing the details of high voltage control means in FIG. 1.

An example of the conventional art will hereinafter be schematically described with reference to FIGS. 1, 2, and 3 of the accompanying drawings.

Description will be made here with attention paid only to a high voltage output called a high voltage A. When there are a plurality of outputs, time division control is effected by the use of a multiplexer or the like, whereby a plurality of outputs are also realized.

Each part will first be described. An inverter transformer T1 converts a voltage inputted to a primary side in conformity with the turn ratio between the primary side and a secondary side and outputs a predetermined voltage to the secondary side. A switching element Q4 drives the inverter transformer T1. A sample hold circuit 9 latches an input signal for a predetermined period. An A/D converter 10 converts an analog signal into a digital signal. A comparator 11 outputs the result of the comparison of the magnitude of two inputs. A pulse width modulation (PWM) circuit 13 prepares a pulse signal (PWM signal) of an ON/OFF time ratio conforming to the value of an up-down counter 12. A controller 3 governs the control of each element.

Description will now be made of the connection of each part and element and a series of operations.

(a) High Voltage Producing Means 1

A predetermined voltage as B-voltage is inputted to the primary side input of the inverter transformer T1, and the other end of the inverter transformer T1 is connected to the switching element Q4. A pulse signal (PWM signal) is inputted from the PWM circuit 13 in high voltage control means 2 which will be described later to the gate of the switching element Q4. The switching element Q4 performs a switching operation in conformity with the PWM signal to thereby obtain a pulse output conforming to the turn ratio and the PWM signal on the secondary side of the inverter transformer T1. The pulse output is rectified by a diode D301 and a capacitor C201, and a DC high voltage output is produced on the cathode side of the diode D301. A boosting and rectifying circuit 1-2 and driving means 1-1 are generally called fly-back type (or ON/OFF type) converters, and output a higher voltage as the ON time percentage in the switching operation of the switching element Q4 is greater.

Resistors R101 and R102 are connected to the high voltage output, and also a voltage dropped by the resistance division of each resistor, i.e. the detection signal of the high voltage output, is outputted.

(b) High Voltage Control Means 2

The high voltage output detection signal obtained by the resistors R101 and R102 in the high voltage producing means 1 is inputted to the sample hold circuit 9. The sample hold circuit 9 holds the high voltage output detection signal for a predetermined period. The high voltage output detection signal of the A/D converter 10 is converted into digital data and is inputted to one of the input terminals of the digital comparator 11.

A sequence control unit 200 for controlling a high voltage unit 100 outputs digital data corresponding to the output set value (target value) of a high voltage output A. This target value is inputted to the other input terminal of the digital comparator 11.

The digital comparator 11 compares the high voltage output detection signal converted into the digital data with the target value given from the sequence control unit 200. When the high voltage output detection signal is smaller than the target value, the output of the up-down counter 12 is made greater by a predetermined number, and when the high voltage output detection signal is greater than the target value, the output of the up-down counter 12 is made smaller by the predetermined number. The PWM circuit 13 produces an appropriate PWM signal in conformity with the value of the up-down counter 12. The PWM signal is a driving signal for the switching element Q4 in the high voltage producing means 1, and is a signal for determining the switching time percentage of the switching element Q4. When the output of the up-down counter 12 becomes great, the time percentage for which the switching element Q4 is switched on is made great to thereby make the high voltage produced by the high voltage output producing means 1 great. Also, when the count value which is the output of the up-down counter 12 becomes small, the time percentage for which the switching element Q4 is switched on is made small to thereby make the high voltage produced by the high voltage producing means small. By the above-described operation, the high voltage output A is controlled to a predetermined value conforming to the target value. On the other hand, sequence control and image processing in an image forming apparatus such as a copying machine or a printer is complicated, and the scale of an application specific integrated circuit (ASIC) exclusively therefor is increased. The capacity of the exclusive ASIC has become much larger as compared with the capacity of a control chip used for the control of a power source.

Figure 4:
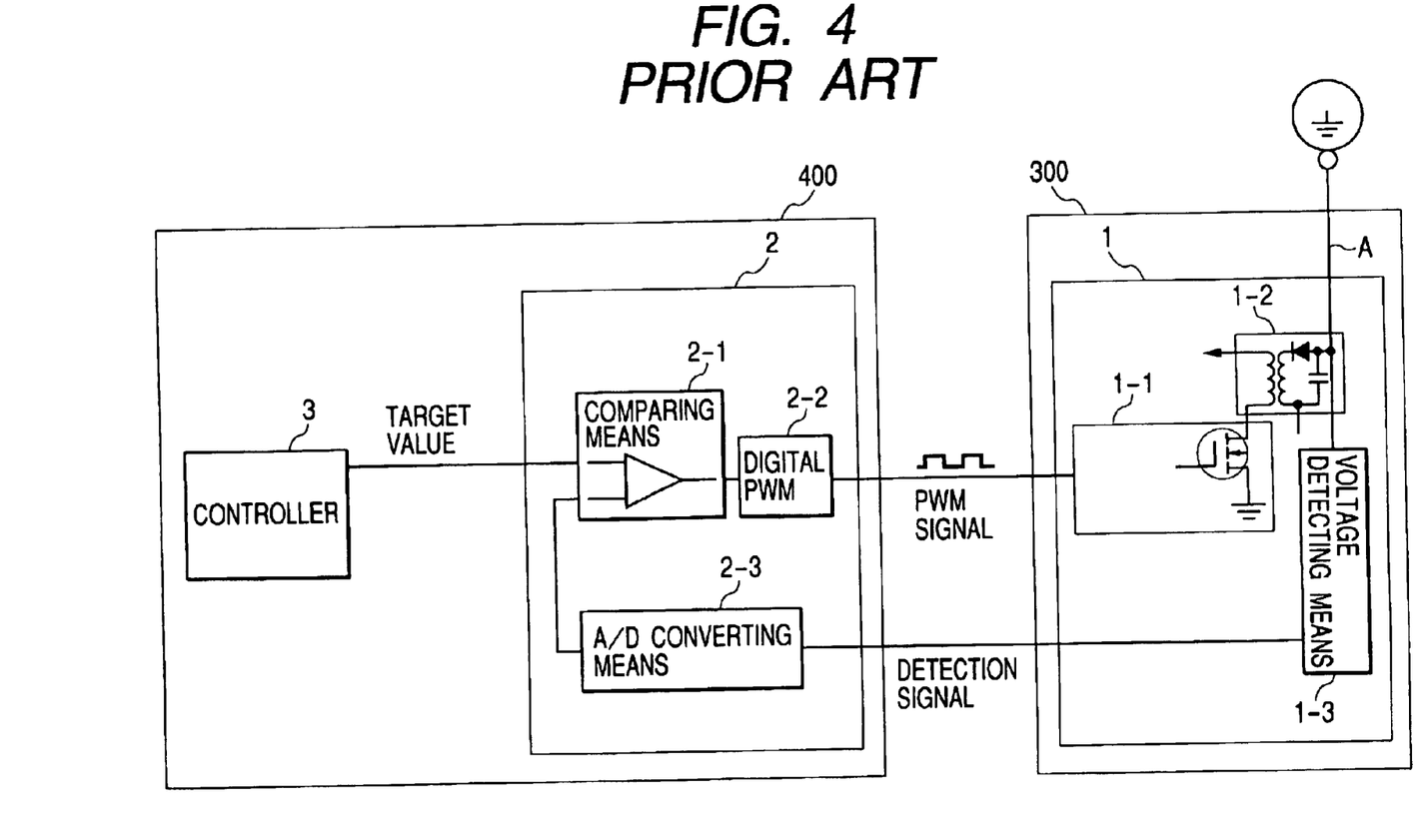
FIG. 4 is a block diagram schematically showing the construction of an example of related art.

So, even if as shown as an example of related art in FIG. 4 of the accompanying drawings, a power source control chip portion (high voltage control means 2) is added to the "extra portion" of the aforedescribed large-scale ASIC exclusively for sequence control/image processing, the scale of the entire circuit is not changed greatly, nor the cost is changed.

The mounted position of the ASIC exclusively for sequence control/image processing, however, is on the sequence control unit 400 or an image processing unit, and these units are units discrete from a switching power source and a high voltage source unit 300, and the mounted position in the image forming apparatus often becomes separate. So, the sequence control unit 400 or the image processing unit and the switching power source and the high voltage source unit 300 are connected together by bundle lines or the like, and the number of signal lines becomes great. Mentioning the high voltage source of the latest color copying machine as an example, there are necessary high voltage outputs for four colors in each of charging (AC+DC), developing (AC+DC) and transferring, and sheet separation and further, auxiliary charging, auxiliary transferring, cleaning, charge removing, etc. as required, and the number of bundle lines reaches the number of bundle lines corresponding to the drive signal, the detection signal, etc. of the respective outputs. Consequently, it is conceivable to digitize the drive information and detection information of each output and effect time division control by serial communication, but in such case, it becomes necessary to mount an encoder/decoder and digital circuits such as a serial communication circuit and a handshake also in the interior of the high voltage source. Thus, even if the power source control chip portion is added to the "extra portion" of the ASIC exclusively for sequence control/image processing, the aforementioned digital circuits further exist in the high voltage source portion, and any cost merit cannot be provided.

SUMMARY OF THE INVENTION

The present invention has been made under such a situation, and provides a power supply apparatus and a switching power supply apparatus in which there is no digital circuit on a power supply side such as output producing means and voltage producing means and the number of signal lines between the power supply side and a control side such as ASIC for sequence control/image processing can be decreased, and an image forming apparatus using these power supply apparatuses.

That is, in the present invention, the power supply apparatus is constructed as described in items (1) and (2) below, the switching power supply apparatus is constructed as described in items (6) to (12) below, and the image forming apparatus is constructed as described in items (3) to (5) and (13) below.

(1) There is provided a power supply apparatus provided with a sequence control unit to which a power source control chip is added, output producing means for producing an output conforming to a PWM signal from the power source control chip, and feeding back an output detection signal to the power source control chip, and a signal line for connecting the power source control chip and the output producing means together, wherein a modulated wave amplitude-modulated with the PWM signal as a carrier wave and with the output detection signal as a modulating wave is transmitted to the signal line.

(2) There is provided a power supply apparatus provided with an image processing unit to which a power source control chip is added, output producing means for producing an output conforming to a PWM signal from the power source control chip, and feeding back an output detection signal to the power source control chip, and a signal line for connecting the power source control chip and the output producing means together, wherein a modulated wave amplitude-modulated with the PWM signal as a carrier wave and with the output detection signal as a modulating wave is transmitted to the signal line.

(3) The sequence control unit comprises an ASIC and is applied to an image forming apparatus in which sequence control is effected.

(4) The image processing unit comprises an ASIC and is applied to an image forming apparatus in which image processing is effected.

(5) The output producing means produces a high voltage output for at least one of charging, transferring, developing, sheet separating, cleaning and charge removing.

(6) A switching power supply apparatus having voltage producing means for producing a predetermined voltage and controlling means for controlling the voltage by a digital circuit, the voltage producing means having a transformer, rectifying and smoothing means for rectifying and smoothing the output of the transformer, driving means for driving the transformer, detecting means for detecting an output obtained by the rectifying and smoothing means, and modulating means for modulating with a detection output detected by the detecting means as a modulating wave, the control means having demodulating means for demodulating the detection output from a signal modulated by the modulating means, sample/hold means for sampling/holding the demodulated detection output, A/D converting means for converting the output of the sample/hold means into a digital signal, comparing means for comparing the output of the A/D converting means with an output target value, a counter operating in conformity with the output of the comparing means, and PWM signal producing means for producing a PWM signal for driving the driving means in conformity with the output of the counter.

(7) The modulating means modulates with a PWM signal for switching the driving means as a carrier wave.

(8) The modulating means amplitude-modulates the carrier wave.

(9) The modulating means varies the signal level of a period for which the PWM signal switches on the driving means to thereby amplitude-modulate.

(10) The modulating means varies the signal level of a period for which the PWM signal switches off the driving means to thereby amplitude-modulate.

(11) The control means is made integral with the ASIC for sequence control as a control chip.

(12) The control means is made integral with the ASIC for image processing as a control chip.

(13) The switching power supply apparatus is a high voltage source for an image forming apparatus.

DESCRIPTION OF THE PREFERRED EMBODIMENTS

Some embodiments of the present invention will hereinafter be described in detail with respect to embodiments of an image forming apparatus. Each embodiment is one in which high voltage control means (power supply control chip) is contained in a sequence control unit (ASIC exclusively for sequence control), but can equally be carried out in a form in which the high voltage controlling means (power source control chip) is contained in an image processing unit (ASIC exclusively for image processing).

(Embodiment 1)

An image forming apparatus which is Embodiment 1 will hereinafter be described with reference to FIGS. 5 to 8.

Figure 5:
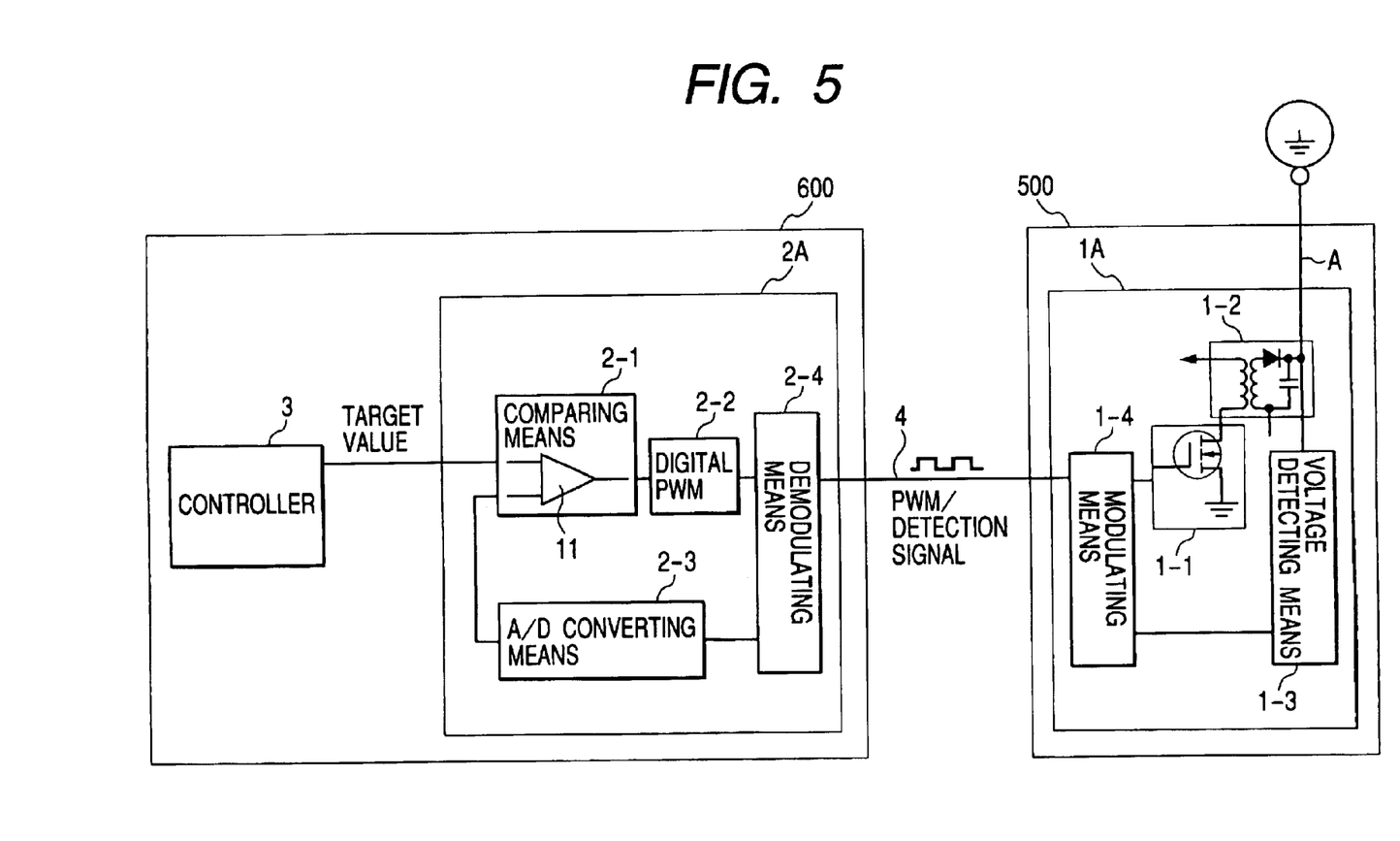
FIG. 5 is a block diagram schematically showing the construction of the essential portions of Embodiment 1.
Figure 6:
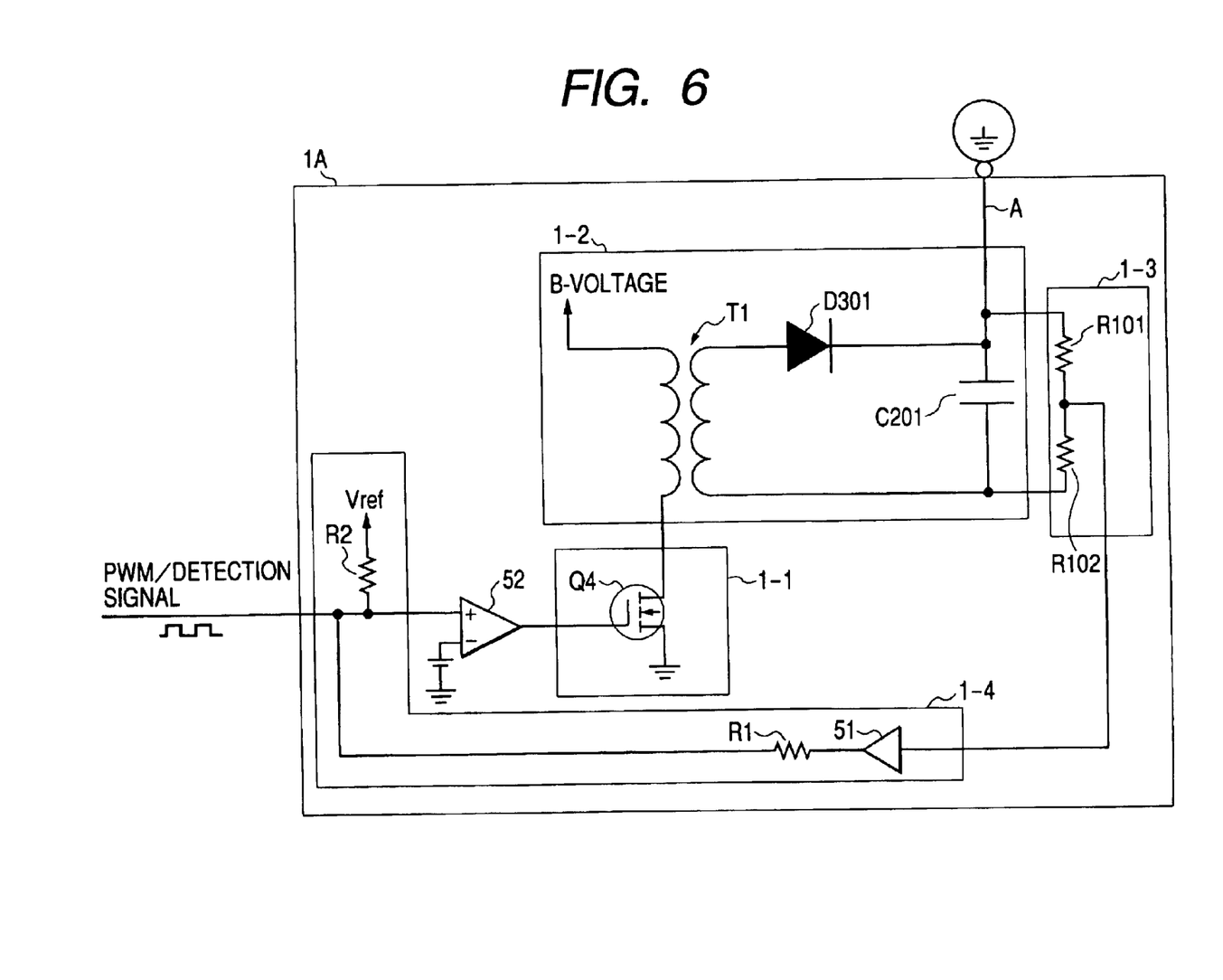
FIG. 6 is a circuit diagram showing the details of high voltage producing means in FIG. 5.
Figure 7:
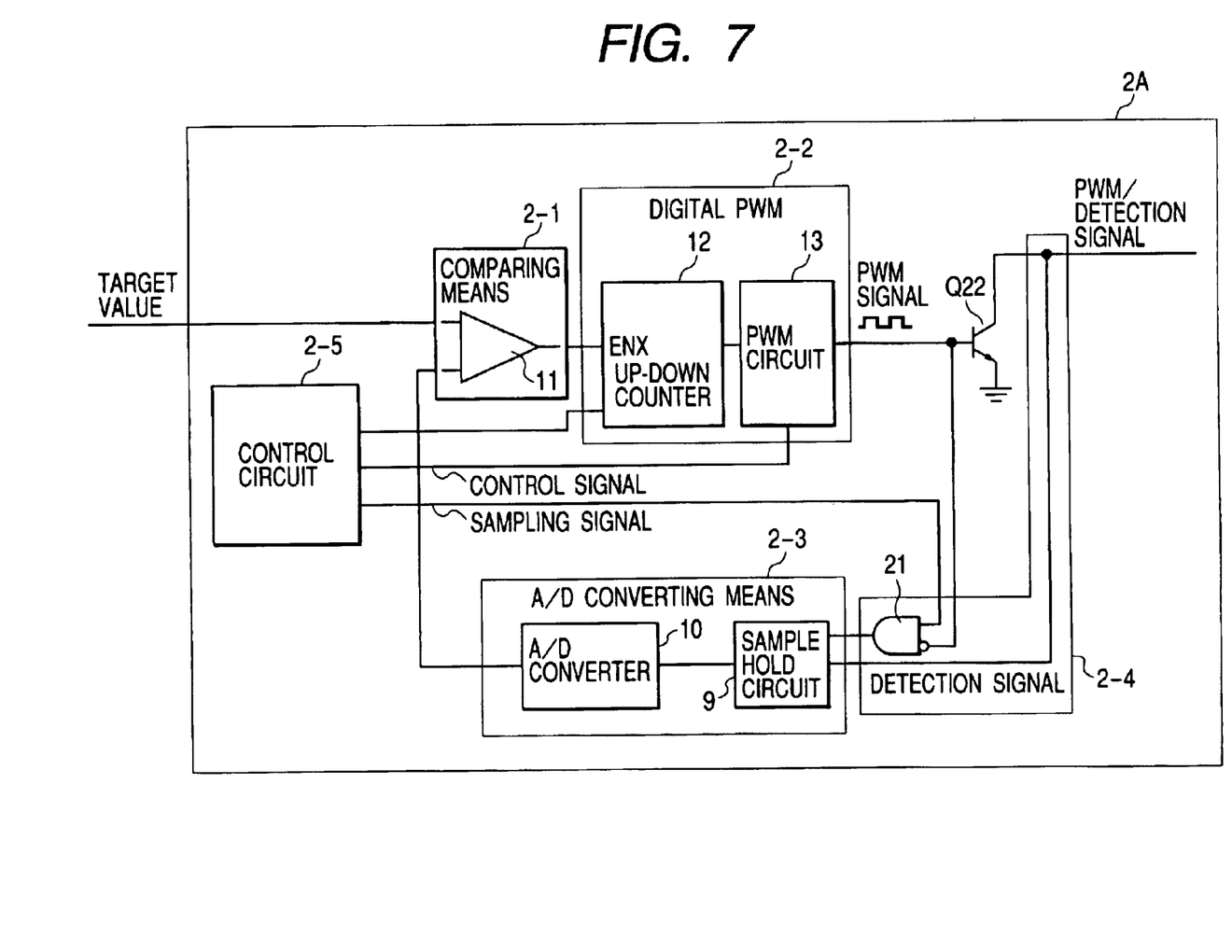
FIG. 7 is a block diagram showing the details of high voltage controlling means in FIG. 5.

FIG. 5 is a diagram showing the construction of a high voltage source apparatus for forming an image forming process in the present image forming apparatus, and FIGS. 6 and 7 are diagrams showing high voltage producing means 1A and high voltage controlling means 2A, respectively, in detail. The constructions of charging, transferring, developing, sheet separating, cleaning, charge removing, etc. which are image forming process elements are similar to those of conventional ones and need not be described.

In FIG. 5, a high voltage unit 500 has the high voltage producing means 1A. A sequence control unit 600 has the high voltage controlling means 2A for controlling the high voltage producing means 1A, and a controller 3. The essential portion of the sequence control unit 600 is comprised of an ASIC exclusively for sequence control to which a power source control chip which is the high voltage controlling means 2A is added. The controller 3 is provided by a controller for sequence control. The high voltage producing means 1A is a power source for the image forming process, and a high voltage output is supplied as A, for example, to a transfer roller which is an image forming process element.

Each part will first be described. An inverter transformer T1 boosts and converts a voltage inputted to a primary side in conformity with the turn ratio between the primary side and a secondary side and the ON/OFF time ratio of a PWM signal, and outputs a predetermined voltage to the secondary side. A switching element Q4 drives the inverter transformer T1. An analog buffer 51 is an impedance converter for outputting an output voltage detected by output voltage detecting means 1-3 at a low impedance. Modulating means 1-4 is constituted by a reference voltage Vref, resistors R1, R2 and the analog buffer 51. An analog comparator 52 receives a PWM/detection signal which will be described later at a high impedance, and switches on the switching element Q4 when the voltage level of one terminal side is a predetermined value or greater, and switches off the switching element Q4 when the aforementioned voltage level is less than the predetermined value.

A sample hold circuit 9 latches an input signal for a predetermined period. An A/D converter 10 converts an analog signal into a digital signal. A digital comparator 11 outputs the result of the comparison of the magnitude of two inputs. A PWM circuit 13 prepares a pulse signal (PWM signal) of an ON/OFF time ratio conforming to the value of an up-down counter 12. Gate means 21 is used to demodulate a detection signal from a PWM/detection signal (amplitude modulating wave) which will be described later on the basis of a sampling signal and the PWM signal.

A control circuit 2-5 governs the control of each element, whereby each element in the high voltage controlling means 2A is controlled appropriately.

Description will now be made of the connection of each part and element and a series of operations.

(a) High Voltage Producing Means 1A

A predetermined voltage as B-voltage is inputted to the primary side input of the inverter transformer T1, and the other end of the inverter transformer T1 is connected to the switching element Q4. The PWM/detection signal open-collector-outputted from the high voltage controlling means 2A which will be described later, and inputted through a signal line 4 has only its PWM signal component, i.e., pulse width information, taken out by the analog comparator 52 and inputted to the gate of the switching element Q4. The switching element Q4 performs a switching operation in conformity with the PWM signal to thereby obtain a pulse output conforming to the turn ratio and the PWM signal on the secondary side of the inverter transformer T1. The pulse output is rectified by a diode D301 and a capacitor C201 and produces a DC high voltage output on the cathode side of the diode D301. Boosting and rectifying means 1-2 and driving means 1-1 are generally called fly-back type (or ON/OFF type) converters, and output a higher voltage as the ON time percentage in the switching operation of the switching element Q4 is greater.

The high voltage output is supplied to a high voltage load (e.g. a charger or the like) and contributes to an electrophotographic image forming process.

A resistor R101 and a resistor R102 are connected to the high voltage output, and a voltage dropped by the resistance division of the resistors R101 and R102, i.e., a detection signal of the high voltage output, is outputted. The detected signal is amplitude-modulated by the analog buffer 51, the reference voltage Vref and the resistors R1, R2 with the PWM signal open-collector-outputted from the high voltage controlling means 2A as a carrier wave and with the detection signal as a modulating wave (modulating signal).

(b) High Voltage Controlling Means 2A

Figure 8:
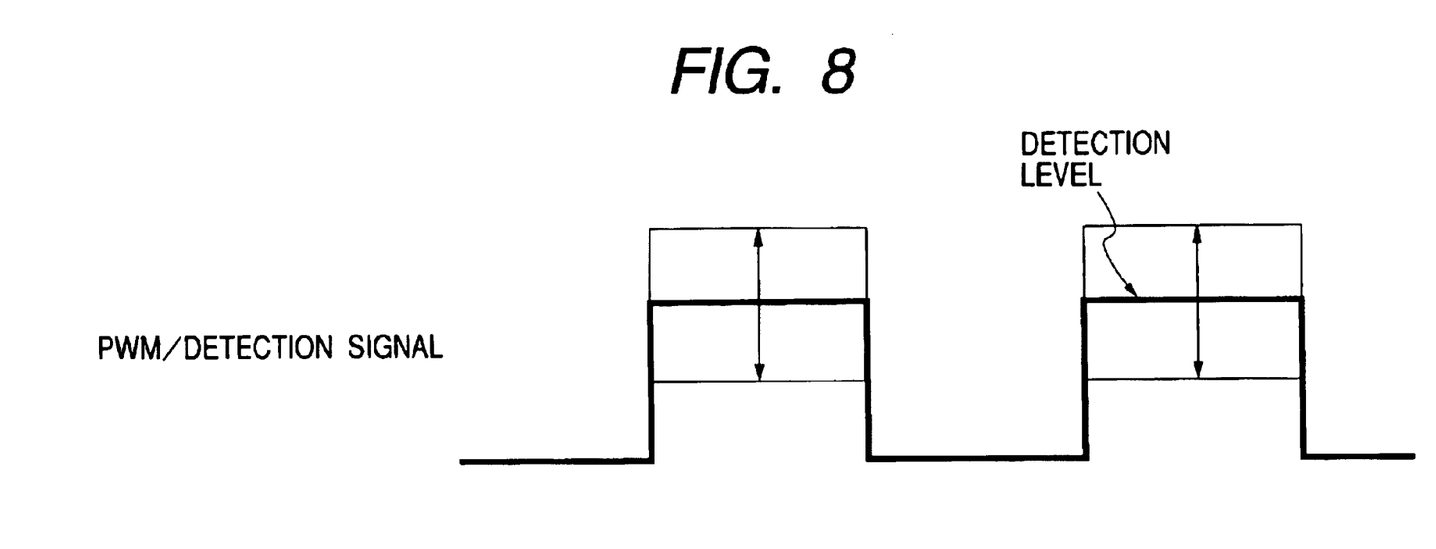
FIG. 8 shows the waveform of a PWM/detection signal.

The PWM/detection signal (modulated wave) amplitude-modulated in the high voltage producing means 1A has a waveform as shown in FIG. 8. The PWM/detection signal is an open collector output and is pulled up to an output voltage detection signal level in the high voltage producing means 1A and therefore, by gate means 21, the PWM signal operates the sample hold circuit 9 at high timing on the basis of a sampling signal to thereby demodulate the output voltage detection signal, and input it to the A/D converter 10. The A/D converter 10 converts the high voltage output detection signal into digital data, which is inputted to one of the input terminals of the digital comparator 11.

The controller 3 in the sequence control unit 600 for controlling the high voltage unit 500 outputs digital data corresponding to the output set value (target value) of the high voltage output A. The target value is inputted to the other input terminal of the digital comparator 11.

In the digital comparator 11, the high voltage output detection signal converted into the digital data is compared with the target value given from the controller 3. If the high voltage output detection signal is smaller than the target value, a count value which is the output of the up-down counter 12 is made greater by a predetermined number, and if the high voltage output detection signal is greater than the target value, the count value of the up-down counter 12 is made smaller by the predetermined number. The PWM circuit 13 produces an appropriate PWM signal in conformity with the count value of the up-down counter 12. A transistor Q22 makes the PWM signal into the PWM/detection signal of the open collector output and outputs it. The PWM/detection signal is a signal which becomes a driving signal for the switching element Q4 in the high voltage producing means 1A, and determines the switching time percentage of the switching element Q4. When the count value of the up-down counter 12 becomes great, the time percentage for which the switching element Q4 is switched on is made great, whereby the high voltage produced by the high voltage producing means 1A is made great. Also, when the count value of the up-down counter 12 becomes small, the time percentage for which the switching element Q4 is switched on is made small, whereby the high voltage produced by the high voltage producing means 1A is made small. By the above-described operation, the high voltage output A is controlled to a predetermined value conforming to the target value.

As described above, according to the present embodiment, there is no digital circuit on the high voltage unit side, and the number of signal lines between the high voltage unit and the sequence control unit is decreased, and the high voltage source control chip is contained in the ASIC exclusively for sequence control and therefore, a cost merit can be provided.

The high voltage output can be supplied as a high voltage output not only for the illustrated charging and transferring, but also auxiliary charging, auxiliary transferring, cleaning, charge removing etc.

(Embodiment 2)

An image forming apparatus which is Embodiment 2 will now be described with reference to FIGS. 9 to 11. While Embodiment 1 is characterized in that modulation is effected at the timing whereat the switching element Q4 is switched on, and the voltage detection level is sent to the high voltage controlling means, the present embodiment is characterized in that modulation is effected at the timing whereat the switching element Q4 is switched off, and the voltage detection level is sent to the high voltage controlling means.

The construction of the sequence control unit, the construction of the high voltage unit, the connection relation between the sequence control unit and the high voltage unit, and each part in the present embodiment are substantially similar to those in Embodiment 1 and therefore need not be described, but the description of Embodiment 1 is invoked.

Figure 9:
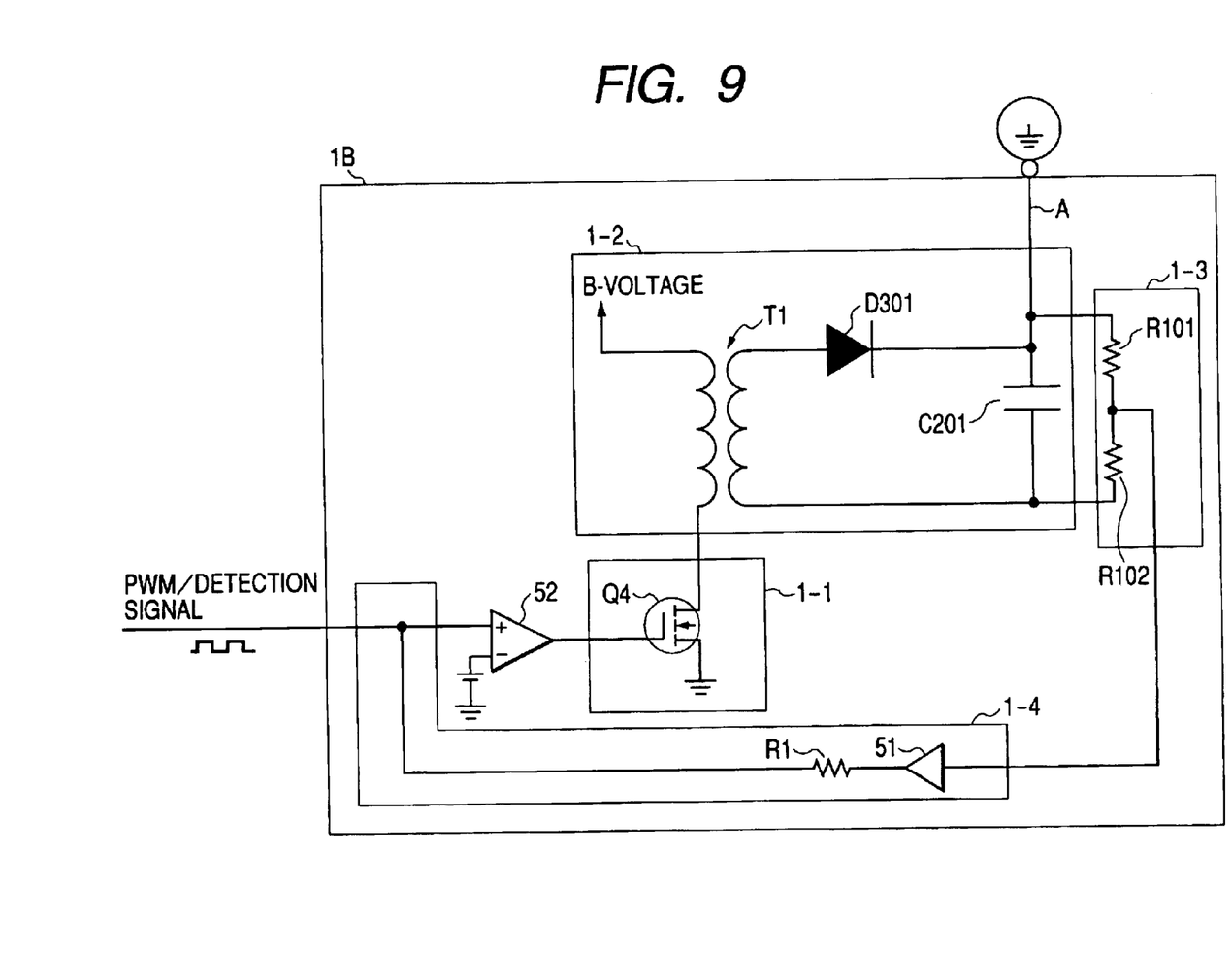
FIG. 9 is a circuit diagram showing the construction of high voltage producing means in Embodiment 2.
Figure 10:
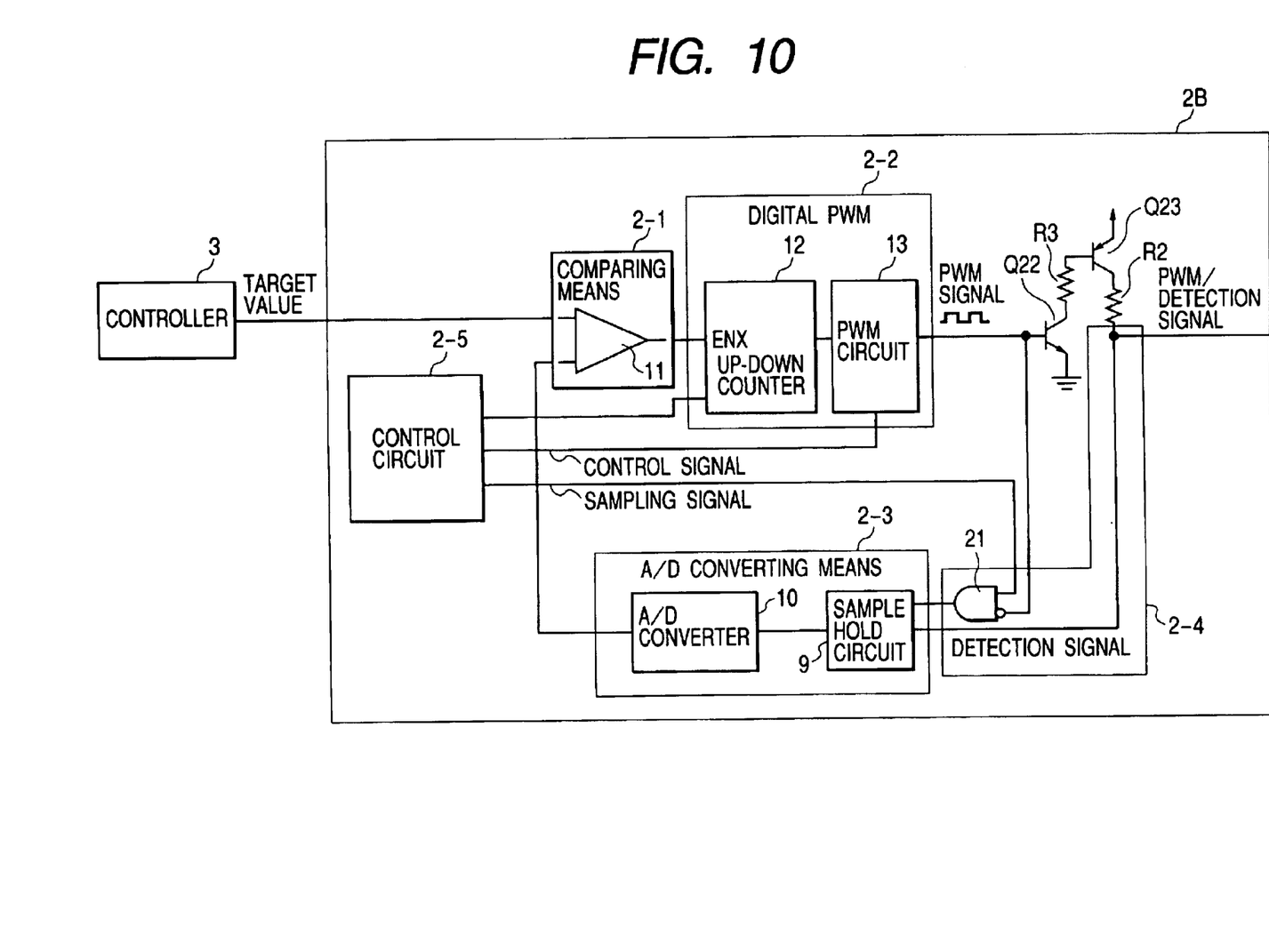
FIG. 10 is a block diagram showing the construction of high voltage controlling means in Embodiment 2.

FIGS. 9 and 10 show the constructions of high voltage producing means 1B and high voltage controlling means 2B, respectively.

The high voltage producing means 1B produces a high voltage output A for forming the image forming process, and the high voltage output A is supplied to e.g. a transfer roller which is an image forming process element.

The connection of each part and element and a series of operations will now be described.

(a) High Voltage Producing Means 1B

A predetermined voltage as B-voltage is inputted to the primary side input of the inverter transformer T1, and the other end of the inverter transformer T1 is connected to the switching element Q4. A PWM/detection signal outputted from the high voltage controlling means 2B which will be described later has only its PWM signal component, i.e. pulse width information, taken out by the analog comparator 52 and inputted to the gate of the switching element Q4. The switching element Q4 performs the switching operation in conformity with the PWM signal to thereby obtain a pulse output conforming to the turn ratio and the PWM signal on the secondary side of the inverter transformer T1. The pulse output is rectified by the diode D301 and the capacitor C201, and a DC high voltage output is produced on the cathode side of the diode D301. The boosting and rectifying means 1-2 and the driving means 1-1 are generally called fly-back type (or ON/OFF type) converters, and output a higher voltage as the ON time percentage in the switching operation of the switching element Q4 is greater.

The high voltage output A is supplied to a high voltage load (e.g. a charger or the like) and contributes to the electrophotographic image forming process.

The resistor R101 and the resistor R102 are connected to the high voltage output A, and a voltage dropped by the resistance division of the resistors, i.e., the detection signal of the high voltage output is outputted thereto. The detected signal amplitude-modulates a PWM/detection signal outputted from the high voltage controlling means 2B through the analog buffer 51 and the resistor R1. That is, at the timing whereat the PWM/detection signal is open (a transistor Q23 is OFF), the signal assumes an output voltage detection level as shown in FIG. 11, and is transmitted to the high voltage controlling means 2B.

(b) High Voltage Controlling Means

Figure 11:
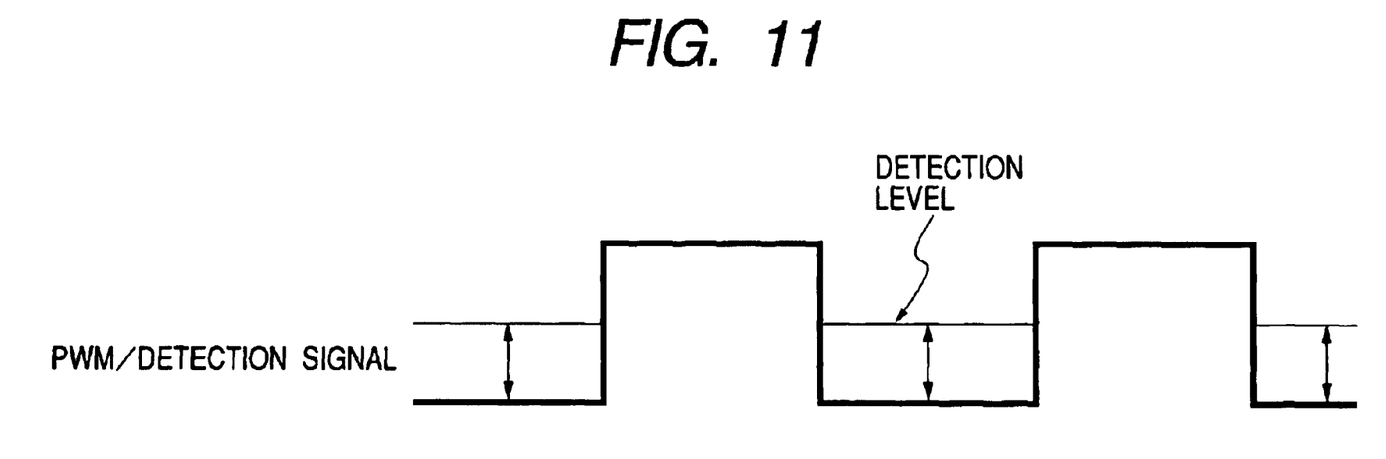
FIG. 11 shows the waveform of a PWM/detection signal.

The PWM/detection signal amplitude-modulated in the high voltage producing means 1B has a waveform as shown in FIG. 11. At the timing whereat the PWM/detection signal is open (the transistor Q23 is OFF), this signal assumes the output voltage detection level as shown in FIG. 11 and therefore, on the basis of a sampling signal, the sample hold circuit 9 is operated by the gate means 21 at the timing whereat the PWM signal is open to thereby demodulate the output voltage detection signal, which is then inputted to the A/D converter 10. The A/D converter 10 converts the high voltage output detection signal into digital data, which is inputted to one of the input terminals of the digital comparator 11.

The controller 3 in the sequence control unit for controlling the high voltage unit outputs digital data corresponding to the output set value (target value) of the high voltage output A. The target value is inputted to the other input terminal of the digital comparator 11.

In the digital comparator 11, the high voltage output detection signal converted into the digital data is compared with the target value given from the controller 3. If the high voltage output detection signal is smaller than the target value, the count value of the up-down counter 12 is made greater by a predetermined number, and if the high voltage output detection signal is greater than the target value, the count value of the up-down counter 12 is made smaller by the predetermined number. The PWM circuit 13 produces an appropriate PWM signal in conformity with the count value of the up-down counter 12. The PWM signal is made into the PWM/detection signal of an open collector output by the transistor Q23 and is outputted. The PWM/detection signal is a signal which becomes a drive signal for the switching element Q4 in the high voltage producing means 1B, and determines the switching time percentage of the switching element Q4. When the count value of the up-down counter 12 becomes great, the time percentage for which the switching element Q4 is switched on is made great, whereby the high voltage produced by the high voltage producing means 1B is made great. Also, when the count value of the up-down counter 12 becomes small, the time percentage for which the switching element Q4 is switched on is made small, whereby the high voltage produced by the high voltage producing means 1B is made small. By the above-described operation, the high voltage output A is controlled to a predetermined value conforming to the target value.

As described above, according to the present embodiment, there is no digital circuit on the high voltage unit side and the number of signal lines between the high voltage unit and the sequence control unit is decreased, and the high voltage source control chip is contained in the ASIC exclusively for sequence control and therefore, a cost merit can be provided.

The high voltage output can be supplied as a high voltage output not only for the illustrated charging and transferring, but also for developing, sheet separating, auxiliary charging, auxiliary transferring, cleaning, charge removing, etc.

According to the present invention, use is made of the PWM/detection signal modulated by the output voltage detection signal with the PWM signal for driving the driving means in the high voltage producing means as a carrier wave, whereby the absence of the digital circuit on the power source side and a decrease in the number of signal lines between the power source side and the control side can be realized.

Thereby, the cost merit by making the ASIC exclusively for sequence control/image processing and the power source control chip portion integral with each other can be provided.

While the present invention has been described above with respect to the preferred embodiments thereof, of course, the present invention is not restricted to these embodiments, but various changes and modifications are possible within the scope of the invention as defined in the appended claims.

What is claimed is:

1. A power supply apparatus comprising:
   a sequence control unit to which a power source control chip is added;
   output producing means for producing an output conforming to a PWM signal from said power source control chip, and feeding back an output detection signal to said power source control chip; and
   a signal line for connecting said power source control chip and said output producing means together,
   wherein a modulated wave amplitude-modulated with said PWM signal as a carrier wave and with said output detection signal as a modulating wave is transmitted to said signal line.

2. A power supply apparatus comprising:
   an image processing unit to which a power source control chip is added;
   output producing means for producing an output conforming to a PWM signal from said power source control chip, and feeding back an output detection signal to said power source control chip; and
   a signal line for connecting said power source control chip and said output producing means together,
   wherein a modulated wave amplitude-modulated with said PWM signal as a carrier wave and with said output detection signal as a modulating wave is transmitted to said signal line.

3. An image forming apparatus comprising:
   a power supply apparatus as recited in claim 1,
   wherein a sequence control unit of said power supply apparatus comprises an ASIC and effects sequence control.

4. An image processing apparatus comprising:
   a power supply apparatus as recited in claim 2,
   wherein an image processing unit of said power supply apparatus comprises an ASIC and effects image processing.

5. An image forming apparatus according to claim 3, wherein output producing means of said power supply apparatus produces a high voltage output for at least one of charging, transferring, developing, sheet separating, cleaning and charge removing.

6. An image processing apparatus according to claim 4, wherein output producing means of said power supply apparatus produces a high voltage output for at least one of charging, transferring, developing, sheet separating, cleaning and charge removing.

7. A switching power supply apparatus comprising:
   voltage producing means for producing a predetermined voltage; and
   controlling means for controlling the voltage by a digital circuit,
   wherein said voltage producing means has a transformer, rectifying and smoothing means for rectifying and smoothing an output of said transformer, driving means for driving said transformer, detecting means for detecting an output obtained by said rectifying and smoothing means, and modulating means for modulating with a detection output detected by said detecting means as a modulating wave, and
   wherein said controlling means has demodulating means for demodulating the detection output from a signal modulated by said modulating means, sample hold means for sampling and holding said demodulated detection output, A/D converting means for converting an output of said sample hold means into a digital signal, comparing means for comparing an output of said A/D converting means with an output target value, a counter adapted to be operated in conformity with an output of said comparing means, and PWM signal producing means for producing a PWM signal for driving said driving means.

8. A switching power supply apparatus according to claim 7, wherein said modulating means modulates with the PWM signal for switching said driving means as a carrier wave.

9. A switching power supply apparatus according to claim 8, wherein said modulating means amplitude-modulates the carrier wave.

10. A switching power supply apparatus according to claim 9, wherein said modulating means varies a signal level of a period for which said PWM signal switches on said driving means to thereby amplitude-modulate.

11. A switching power supply apparatus according to claim 9, wherein said modulating means varies a signal level of a period for which said PWM signal switches off said driving means to thereby amplitude-modulate.

12. A switching power supply apparatus according to claim 7, wherein said controlling means is made integral with an ASIC for sequence control as a control chip.

13. A switching power supply apparatus according to claim 7, wherein said controlling means is made integral with an ASIC for image processing as a control chip.

14. An image forming apparatus comprising:
   a switching power supply apparatus as recited in claim 7,
   wherein said switching power supply apparatus is a high voltage source for image forming.

* * * * *